US006529635B1

(12) United States Patent
Corwin et al.

(10) Patent No.: US 6,529,635 B1
(45) Date of Patent: *Mar. 4, 2003

(54) SHAPE-BASED IMAGE COMPRESSION/ DECOMPRESSION USING PATTERN MATCHING

(75) Inventors: Susan Julia Corwin, Portland, OR (US); Thomas D. Fletcher, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,419

(22) Filed: Dec. 15, 1997

(51) Int. Cl.[7] .............................. G06K 9/36; G06K 9/46
(52) U.S. Cl. ..................... 382/243; 382/199; 382/253
(58) Field of Search .......................... 382/243, 242, 382/115, 236, 240, 251, 166, 199, 232; 348/397; 345/443, 441, 442, 468, 144, 964, 968; 358/465, 450, 75; 395/106, 117

(56) References Cited

U.S. PATENT DOCUMENTS

| | | | |
|---|---|---|---|
| 4,783,841 A | * 11/1988 | Crayson | 382/56 |
| 4,868,653 A | 9/1989 | Golin et al. | 358/133 |
| 4,922,545 A | * 5/1990 | Endoh et al. | 382/243 |
| 5,008,748 A | * 4/1991 | Carr et al. | 375/240.12 |
| 5,014,334 A | * 5/1991 | Fukuhara et al. | 382/233 |
| 5,111,392 A | * 5/1992 | Malin | 364/401 |
| 5,204,899 A | * 4/1993 | Israelsen et al. | 375/240.18 |
| 5,225,904 A | 7/1993 | Golin et al. | 358/133 |
| 5,408,542 A | 4/1995 | Callahan | 382/56 |
| 5,455,680 A | 10/1995 | Shin | 358/426 |
| 5,487,116 A | 1/1996 | Nakano et al. | 382/104 |
| 5,506,937 A | 4/1996 | Ford et al. | 395/12 |
| 5,526,295 A | * 6/1996 | Astle | 382/232 |
| 5,539,841 A | 7/1996 | Huttenlocher et al. | 382/218 |
| 5,740,281 A | * 4/1998 | Makato Hirai | 382/243 |
| 5,751,852 A | * 5/1998 | Marimont et al. | 382/180 |
| 5,805,221 A | * 9/1998 | Min-Sup Lee | 348/397 |
| 5,809,179 A | * 9/1998 | Marimont et al. | 382/254 |
| 5,933,535 A | * 8/1999 | Lee et al. | 382/243 |
| 6,072,910 A | * 6/2000 | Maeda et al. | 382/253 |

* cited by examiner

Primary Examiner—Timothy M. Johnson
(74) Attorney, Agent, or Firm—Blakely, Sokoloff, Taylor & Zafman LLP

(57) ABSTRACT

A method and apparatus for compressing a digitized image. Boundaries of regions within a digitized image are identified. Shapes are selected from a bank of shapes based on the identified boundaries to represent the regions. Position and size information based on the position and size of the regions within the digitized image are associated with the selected shapes. Values are transmitted indicating the selected shapes and the associated position and size information as a representation of the digitized image.

18 Claims, 12 Drawing Sheets

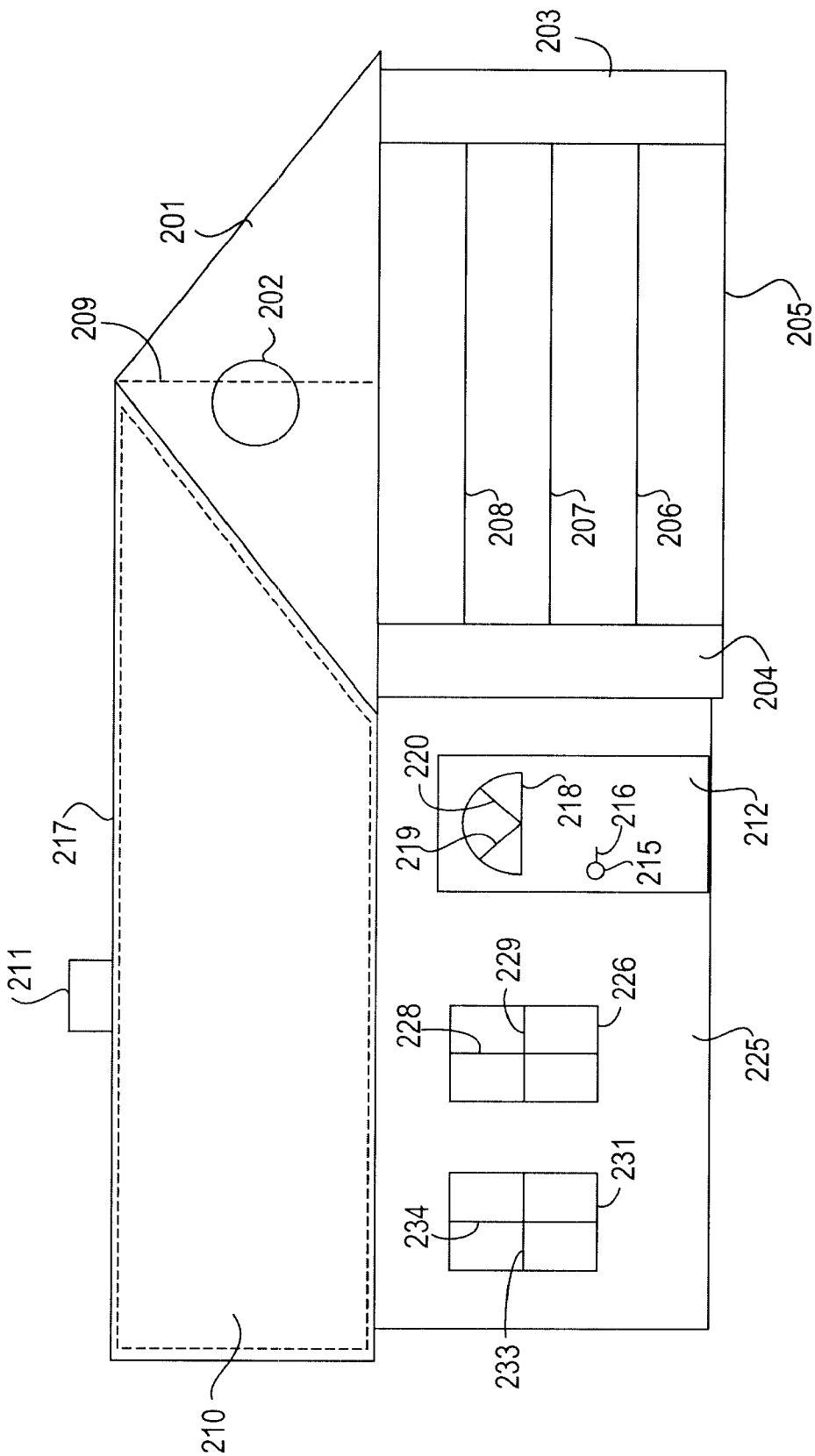

REGION 201

BOUNDARY 1:  DEGREE = 1, STARTPT( , ), ENDPT( , )
    BOUNDARY 2:  DEGREE = 1, STARTPT( , ), ENDPT( , )
    BOUNDARY 3:  DEGREE = 1, STARTPT( , ), ENDPT( , )
    CONSTRUCT AFTER: REGION 217

REGION 202

BOUNDARY 1:  DEGREE = 2, A=⌣STARTPT( , ), ENDPT( , )
    BOUNDARY 2:  DEGREE = 2, A=⌣STARTPT( , ), ENDPT( , )
    CONSTRUCT AFTER: REGION 217, 201

REGION 205

BOUNDARY 1:  DEGREE = 1, STARTPT( , ), ENDPT( , )
    BOUNDARY 2:  DEGREE = 1, STARTPT( , ), ENDPT( , )
    BOUNDARY 3:  DEGREE = 1, STARTPT( , ), ENDPT( , )
    BOUNDARY 4:  DEGREE = 1, STARTPT( , ), ENDPT( , )
    CONSTRUCT AFTER:

REGION 206

BOUNDARY 1:  DEGREE = 1, STARTPT( , ), ENDPT( , )
    CONSTRUCT AFTER: REGION 205

⋮

REGION 218

BOUNDARY 1:  DEGREE = 2, A=⌣STARTPT( , ), ENDPT( , )
    BOUNDARY 2:  DEGREE = 1, STARTPT( , ), ENDPT( , )
    CONSTRUCT AFTER: REGION 225, 212

REGION 219

BOUNDARY 1:  DEGREE = 1, STARTPT( , ), ENDPT( , )
    CONSTRUCT AFTER: REGION 225, 212, 218

⋮

REGION 217

BOUNDARY 1:  DEGREE = 1, STARTPT( , ), ENDPT( , )
    BOUNDARY 2:  DEGREE = 1, STARTPT( , ), ENDPT( , )
    BOUNDARY 3:  DEGREE = 1, STARTPT( , ), ENDPT( , )
    BOUNDARY 4:  DEGREE = 1, STARTPT( , ), ENDPT( , )
    CONSTRUCT AFTER:

Fig. 10

SHAPE DEFINITION CORRESPONDING TO REGION 217
    SHAPE: RECTANGLE
    PARAMETER LIST:
        EDGE1 STARTPT( , )
        EDGE1 ENDPT( , )
        WIDTH( )

SHAPE DEFINITION CORRESPONDING TO REGION 201
    SHAPE: TRIANGLE
    PARAMETER LIST:
        EDGE1 STARTPT( , )
        EDGE1 ENDPT( , )
        EDGE2 STARTPT( , )
        EDGE2 ENDPT( , )

SHAPE DEFINITION CORRESPONDING TO REGION 202
    SHAPE: CIRCLE
    PARAMETER LIST:
        CENTER( , )
        RADIUS( )

SHAPE DEFINITION CORRESPONDING TO REGION 205
    SHAPE: RECTANGLE
    PARAMETER LIST:
        EDGE1 STARTPT( , )
        EDGE1 ENDPT( , )
        WIDTH( )

SHAPE DEFINITION CORRESPONDING TO REGION 206
    SHAPE: RECTANGLE
    PARAMETER LIST:
        EDGE1 STARTPT( , )
        EDGE1 ENDPT( , )
        WIDTH( )
        ⋮

Fig. 11

```
construct_rectangle (startx, starty, endx, endy, width, shading, buffer)
{
    double startx, starty, endx, endyy, width;
    struct shading_struct *shading;
    char *buffer;
    double n1x, n1y, n2x, n2y;

find_normal (&n1x, &n1y, startx starty, endx, endy, width);
    find_normal &n2x, &n2y, endx, endy, startx, starty, width);
    drawline (buffer, startx, starty, endx, endy);
    drawline (buffer, startx, starty, n1x, n1y);
    drawline (buffer, endx, endy, n2x, n2y,);
    drawline (buffer, n1x, n2y, n2x, n2y);
    fill (buffer, startx, starty, endx, endy, n1x, n1y, n2x, n2y, shading);
    return;

SHAPE-BASED IMAGE COMPRESSION/ DECOMPRESSION USING PATTERN MATCHING

FIELD OF THE INVENTION

The present invention relates to the field of image processing, and more particularly to a method and apparatus for image compression.

BACKGROUND OF THE INVENTION

Modern computer systems are often required to transmit large amounts of image data across relatively low bandwidth communication channels. Consequently, to reduce the amount of bandwidth consumed per image transmission, images are often compressed using one of a number of compression techniques.

In one image compression technique, called "vector quantization", digitized imaged are resolved into small blocks of pixels represented by vectors. Vectors are values that convey color and intensity information. For example, a common type of vector is an RGB vector (i.e., red, green, blue) that indicates the average intensities of red, green and blue colors in a pixel block. In a vector quantization system, each vector of an image is replaced by an index to a table called a codebook. A codebook is a table containing a relatively small number of vectors that can be used to represent vectors in an input image. For each vector in the input image, the codebook is searched to find a representative vector and the address of the representative vector, i.e., a code book index, is transmitted in place of the input vector. Because the codebook indices are smaller than the image vectors, substituting the indices for the image vectors effectively compresses the representation of the image and reduces the bandwidth required to transmit the image. In a receiving device, the codebook indices are used to look up representative vectors in another codebook that is the same as or similar to the codebook used to compress the original image. The representative vectors are then used to construct an output image.

FIG. 1 is a block diagram of a prior art system that performs vector quantization. The system includes an encoder 11 that encodes (i.e., compresses) an input image 12, then transmits the encoded image to a decoder 21. The decoder 21 decodes the encoded image to generate an output image 26. In many cases, the encoder 11 and the decoder 21 are realized by computers programmed to implement corresponding compression and decompression algorithms.

The encoder 11 typically contains a preprocessor 16, a vector quantizer 18, a codebook 17 and a transmitter 19. The preprocessor 16 is used to reduce the amount of image data that is processed by the vector quantizer 18, for example, by filtering high frequency components from the input image 12. The preprocessed image is supplied to the vector quantizer 18 which identifies representative vectors in the codebook 17 that, by some measure, are a best match for vectors in the preprocessed image. Because the codebook 23 in the decoder 21 is typically the same as or similar to the codebook 17 in the encoder 11, addresses of the representative vectors in the codebook 17, i.e., codebook indices, may be transmitted to the decoder 21 and used to look up the representative vectors in the codebook 23. The representative vectors are then used to generate the output image 26. In some implementations, a post processor 25 may perform additional processing (e.g., pixel-block up-sampling, dithering, etc.) to produce the output image 26.

Because the number of representative vectors in the codebook 17 is usually small relative to the total number of possible input vectors, the bit size of each codebook index is correspondingly smaller than the bit size of the input vectors. For example, if each input vector is a 24-bit value (e.g., a "true color" value in which red, green and blue intensities are each represented by a respective one of three bytes) and the codebooks (17 and 23) each contain 256 representative vectors, then a one-byte codebook index can be used to represent each of the three-byte input vectors. This is a 3:1 reduction of the amount of data used to represent the preprocessed image.

One disadvantage of the above-described image compression technique is that the overall compression that can be achieved is limited by the vector-based approach. More specifically, because input images are decomposed into pixel blocks for vector quantization, patterns within the images that could otherwise be exploited for compression purposes may not be recognized. As a result, the overall compression achieved by the above described compression technique may be less than the compression possible with a non-vector-based approach.

SUMMARY OF THE INVENTION

A method and apparatus for compressing a digitized image are disclosed. Boundaries of regions within a digitized image are identified and shapes are selected from a bank of shapes to represent the regions based on the identified boundaries. Position and size information is associated with the selected shapes based on the position and size of the regions within the digitized image. Values indicating the selected shapes and the associated position and size information are transmitted as a representation of the digitized image.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 9 is an image 200 that can be compressed and reconstructed using embodiments of the present invention.

FIG. 10 is a table of region definitions that correspond to the image of FIG. 9.

FIG. 11 is a table of shape definitions that correspond to the image of FIG. 9.

FIG. 12 is an example of a procedure that can be used implement a set of construction rules.

DETAILED DESCRIPTION

According to one embodiment, a digitized image is compressed by resolving the image into a plurality of shapes and then transmitting information indicating the size, location, orientation and shading of each of the shapes to another computer or to a storage medium. Because large numbers of pixels can potentially be encompassed within each shape, a correspondingly large compression factor can be achieved.

Figure 1:
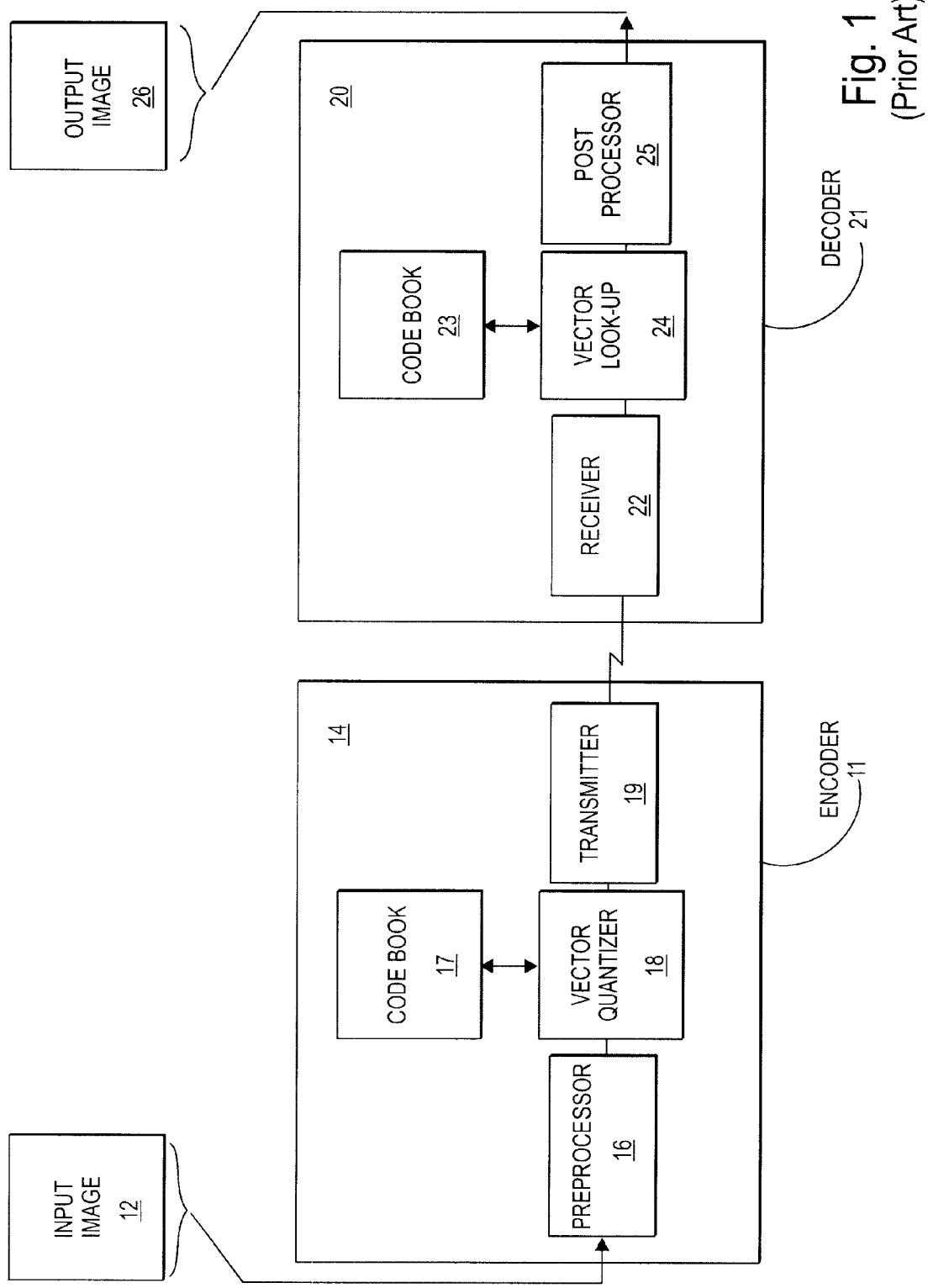
FIG. 1 is a block diagram of a prior art system that performs vector quantization.
Figure 2:
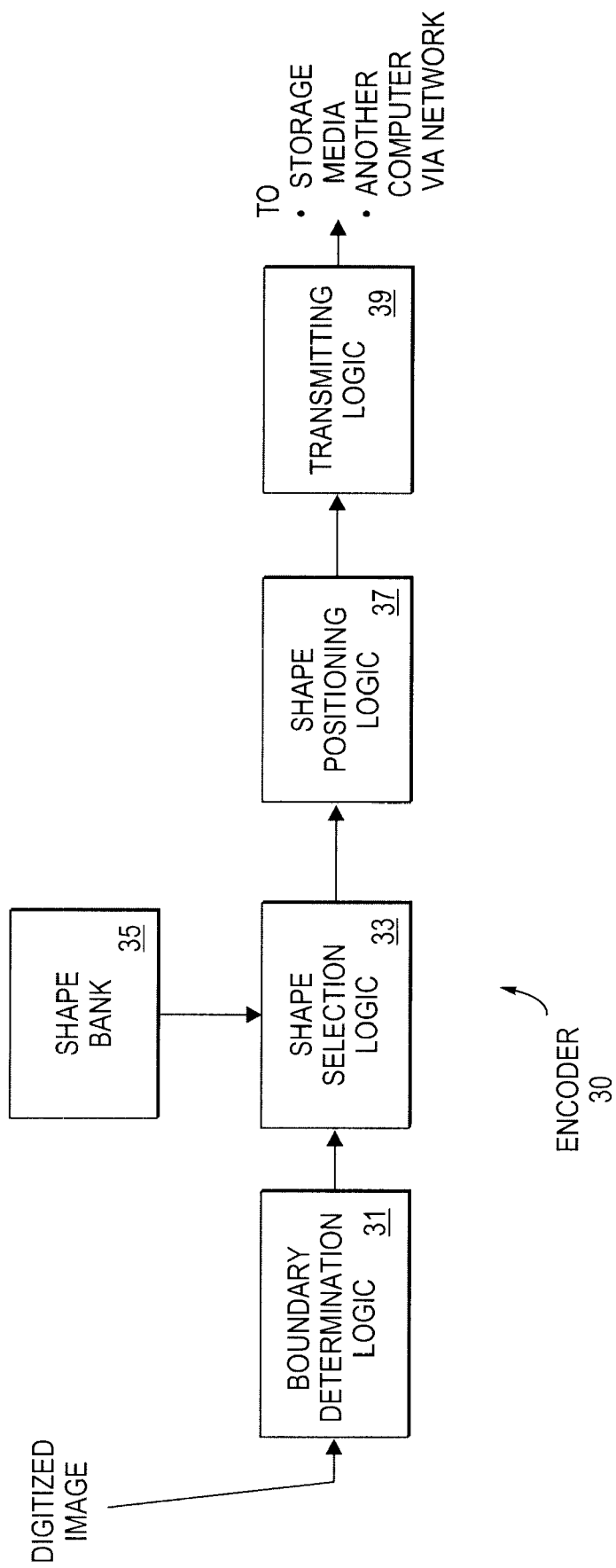
FIG. 2 is a block diagram of one embodiment of an image encoder that can be used to perform shape-based image compression.

FIG. 2 is a block diagram of one embodiment of an image encoder 30 that can be used to perform shape-based image compression. The image encoder 30 includes boundary determination logic 31, shape selection logic 33, shape positioning logic 37 and transmitting logic 39.

A digitized image is initially input to the boundary determination logic 31 which scans rows and columns of pixels in the image to detect abrupt changes in pixel color or intensity. These abrupt changes are called edge transitions because they often mark the edge of a feature in the image. In one embodiment, the boundary determination logic 31 performs curve-fitting analysis to fit adjacent edge transitions to curves. The curves, which may be straight lines or otherwise have any number of inflections, are associated with one another based on points of intersection to define image regions. These region definitions are then supplied to the shape selection logic 33.

As an aside, in one embodiment, the boundary determination logic 31 also associates color information with each identified region. For example, the color of a region, a color gradient (i.e., a gradual change in color of the region from one side to another), and a texture may be identified and recorded in the region definition. Herein, the color, color gradient and texture of a region are referred to collectively as "shading information". Generally, a color gradient may be identified based on the first derivative of the color with respect to pixel position. If the first derivative is constant or nearly so, then a gradual change in color occurs from one side of the image to the other. A texture may be identified based on the second derivative of the color with respect pixel position. If the second derivative is constant or nearly so, then the region is said to have a texture. The texture may be specified, for example, by a sample of the region or by an analytical expression describing the pattern of colors.

Still referring to FIG. 2, the shape selection logic uses the region definitions supplied by the boundary determination logic 31 to identify a representative shape in the shape bank 35. According to one embodiment, the shape bank 35 contains individual images associated with indices called "shape indices". Each individual image is made up of pixel values in a different geometric arrangement so that the shape selection logic 33 can perform pattern-matching analysis to identify shapes in the shape bank 35 that, by one or more criteria, most closely match the image regions. For example, if an image region is defined by straight line boundaries, the number of boundaries can be used to classify the region as a triangle, quadrilateral or other polygon. Further, the angles at which the straight line boundaries intersect can be used to determine, in the case of a quadrilateral for example, whether the region is a parallelogram, rectangle, square, trapezoid, and so forth. Other, less well defined shapes such as a person's hands, feet, facial features, etc., may also be recognized.

In one embodiment of the shape selection logic 33, pattern matching involves statistical analysis to determine a measure of difference between a region and one or more shapes in the shape bank. The shape in the shape bank that is least statistically different from the region and which does not differ from the region by more than a threshold value, is selected to represent the region. In another embodiment, the shape selection logic 33 normalizes each region received from the boundary determination logic 31 to adjust the region's size and orientation before performing pattern matching analysis.

According to one embodiment of the shape selection logic 33, if no shape is found that adequately matches a given region, a shape based on the region definition may be added to the shape bank. As discussed further below, shapes that are added to the shape bank 35 are transmitted to a recipient device along with a set of shape construction rules so that a shape bank in the recipient device may be updated. To prevent the shape bank 35 from growing too large, least recently used shapes in the shape bank 35 may be overwritten by new shapes.

In one embodiment, the shape selection logic 33 stores a shape index in each region definition for which a shape is identified. The shape index corresponds to the identified shape and, in an embodiment discussed below, is used to identify a procedure for constructing the shape in an output image.

Based on the region definitions and associated shape indices, the shape positioning logic 37 generates shape definitions that include shape indices and construction parameters that can be used to construct the shapes in an output image. According to one embodiment, the construction parameters vary from shape to shape but typically include position information to indicate a position in the image at which the shape is to appear, size information to indicate the size of the shape and, if necessary, orientation information to indicate the orientation of the shape in the image. Position information may be specified, for example, by the starting point of an edge of the shape, or by a center point or focal point. Size information may be specified, for example, by starting and ending points of one or more edges in the shape, or by one or more radii. Orientation information may be specified by a starting and ending point of an edge of the shape or by the location of focal points in the shape. In one embodiment, coordinates of features in a shape such as the starting and ending points of a shape edge are given with respect to an x, y coordinate system having an origin at the upper left corner of the image. Other frames of reference may also be used.

The transmitting logic 39 receives the shape definitions from the shape positioning logic 37 and transmits the information to a recipient device. As discussed below, the shape definitions may be ordered for transmission so that shapes that are underneath other shapes are transmitted first.

According to one embodiment of the encoder 30, the boundary determination logic 31, shape selection logic 33, shape positioning logic 37 and transmitting logic 39 are at least partially implemented by a programmed processor in a general purpose computer. The transmitting logic may include hard-wired components necessary to transmit the compressed image data via a computer network (e.g., a modem or an area network card). The boundary determination logic 31, shape selection logic 33 and shape positioning logic 37 may also include hard-wired components.

Figure 3:
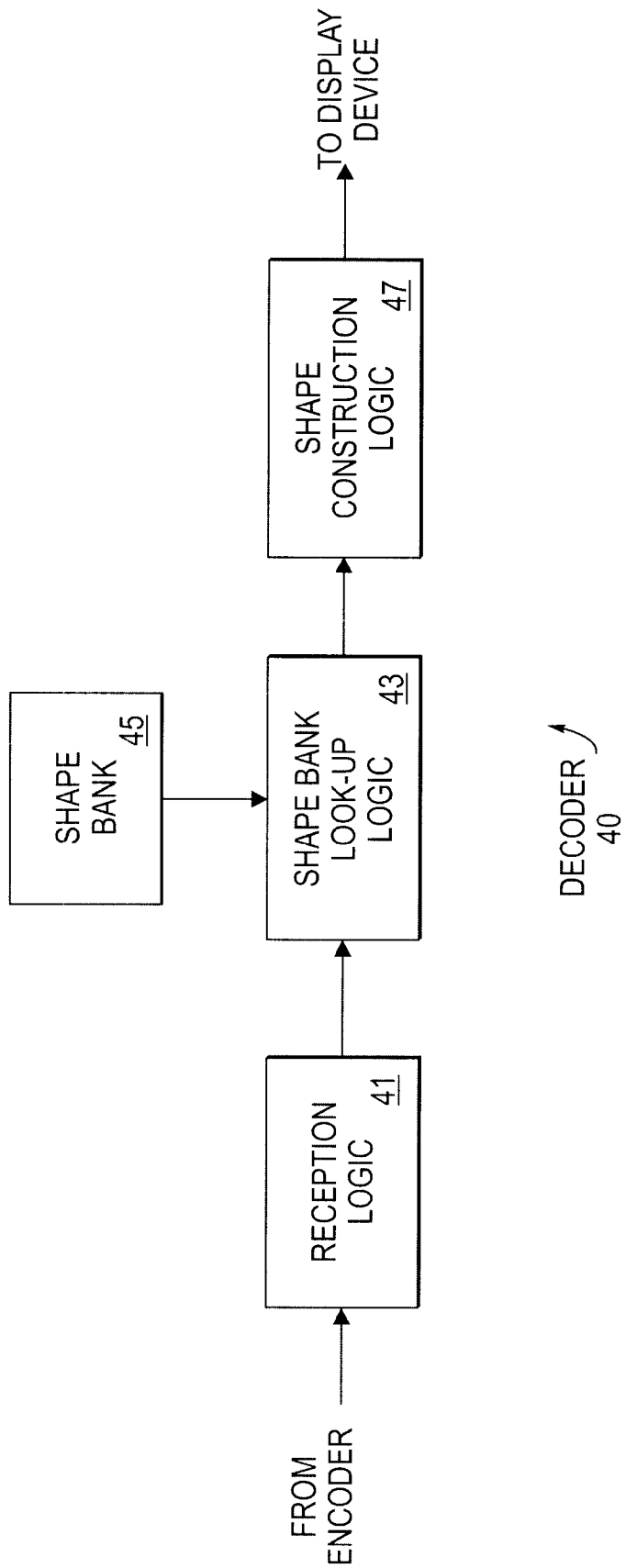
FIG. 3 is a block diagram of one embodiment of a decoder that generates output images based on shape definitions received from the encoder of FIG. 2.

FIG. 3 is a block diagram of one embodiment of a decoder 40 that generates output images based on shape definitions received from the encoder 30 of FIG. 2. The decoder 40 includes reception logic 41, shape bank look-up logic 43, a shape bank 45 and shape construction logic 47.

In one embodiment, the reception logic 41 receives shape definitions from an encoding device via a computer network. Alternatively, the shape definitions may be read from a mass storage medium such as a CD-ROM or a magnetically-encoded disk. The reception logic forwards each shape definition received to the shape bank look-up logic 43.

According to one embodiment, the shape bank look-up logic 43 uses the shape index included in each shape definition to identify a set of shape construction rules in the shape bank 45. The shape bank look-up logic 43 forwards the construction rules and shape definition to the shape construction logic 47 which constructs the shape by writing updated values to a pixel buffer. In one embodiment, the shape construction logic 47 writes shading values into the pixel buffer according to shading information included in the shape definitions. After the shapes in a given image have been constructed, the pixel buffer is rendered onto a display device.

According to one embodiment of the decoder 40 of FIG. 3, the reception logic 41, shape-bank look-up logic 43, and shape construction logic 47 are each at least partially implemented by a programmed processor in a general purpose computer.

Figure 4:
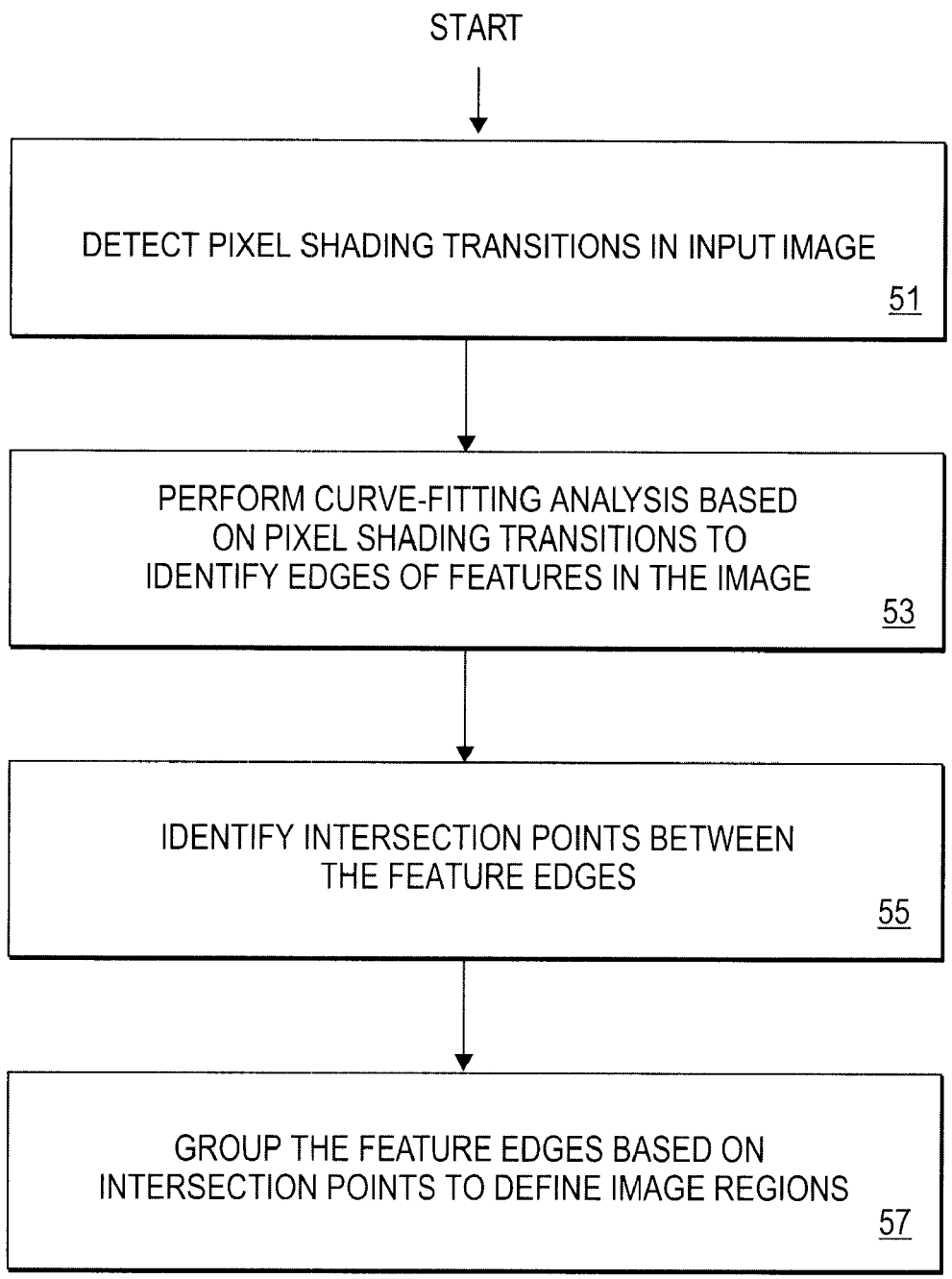
FIG. 4 is a flow diagram according to one embodiment of the boundary detection logic of FIG. 2.

FIG. 4 is a flow diagram according to one embodiment of the boundary detection logic 31 of FIG. 2. At step 51, the boundary determination logic detects edges in the input image by scanning rows and columns of pixels in the input image to detect pixel shading transitions. Herein the expression "pixel shading transitions" refers to abrupt changes in pixel color or intensity. Hard-wired pixel scanning logic that compares the color and intensity of adjacent pixels may be used to detect pixel shading transitions. Alternatively, a programmed processor (e.g., a microprocessor, microcontroller or digital signal processor) may be used to compare adjacent pixels. At step 53, curve-fitting of the pixel shading transitions is used identify feature boundaries. In one embodiment, curve-fitting is performed by computing the coefficients of a number of different polynomial expressions based on the coordinates of the pixel shading transitions, and then determining which of the polynomial expressions (e.g., first degree, second degree, third degree, etc.) most closely maps the coordinates of the pixel shading transitions. After the feature boundaries have been identified, points at which the boundaries intersect one another are identified at step 55. The boundaries are then grouped based on the identified intersection points to define image regions at step 57. According to one embodiment, each region in the image is sampled to determine its color, color gradient and texture (i.e., shading information). Together, the shading information and the boundary information make up the region definition.

Figure 5:
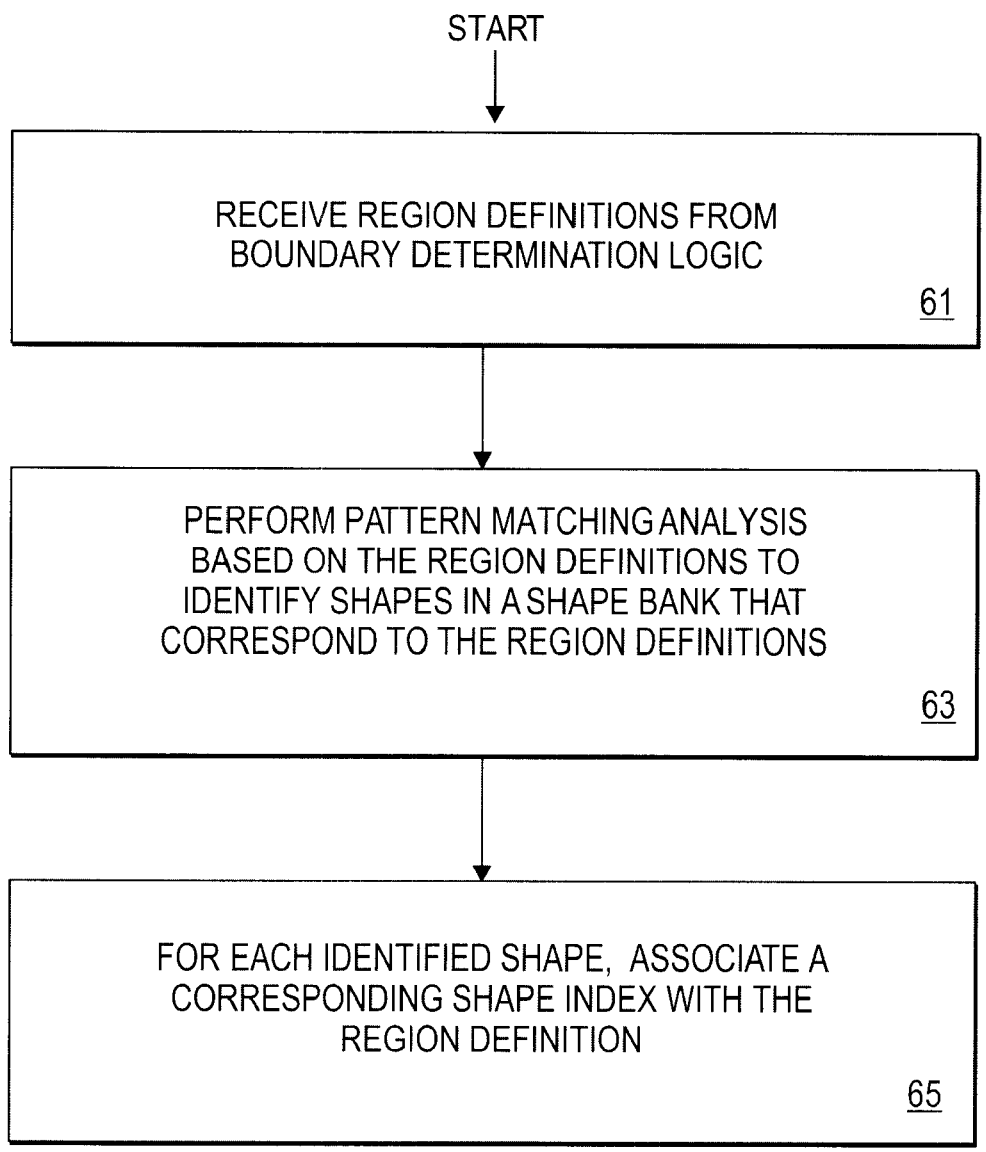
FIG. 5 is a flow diagram according to one embodiment of the shape selection logic of FIG. 2.

FIG. 5 is a flow diagram according to one embodiment of the shape selection logic 33 of FIG. 2. Region definitions are received from the boundary determination logic at step 61. Pattern matching is performed at step 63 to identify shapes in the shape bank that, by one or more criteria, most closely correspond to the region definitions. Then, at step 65, shape indices corresponding to the identified shapes are associated with the region definitions.

Figure 6:
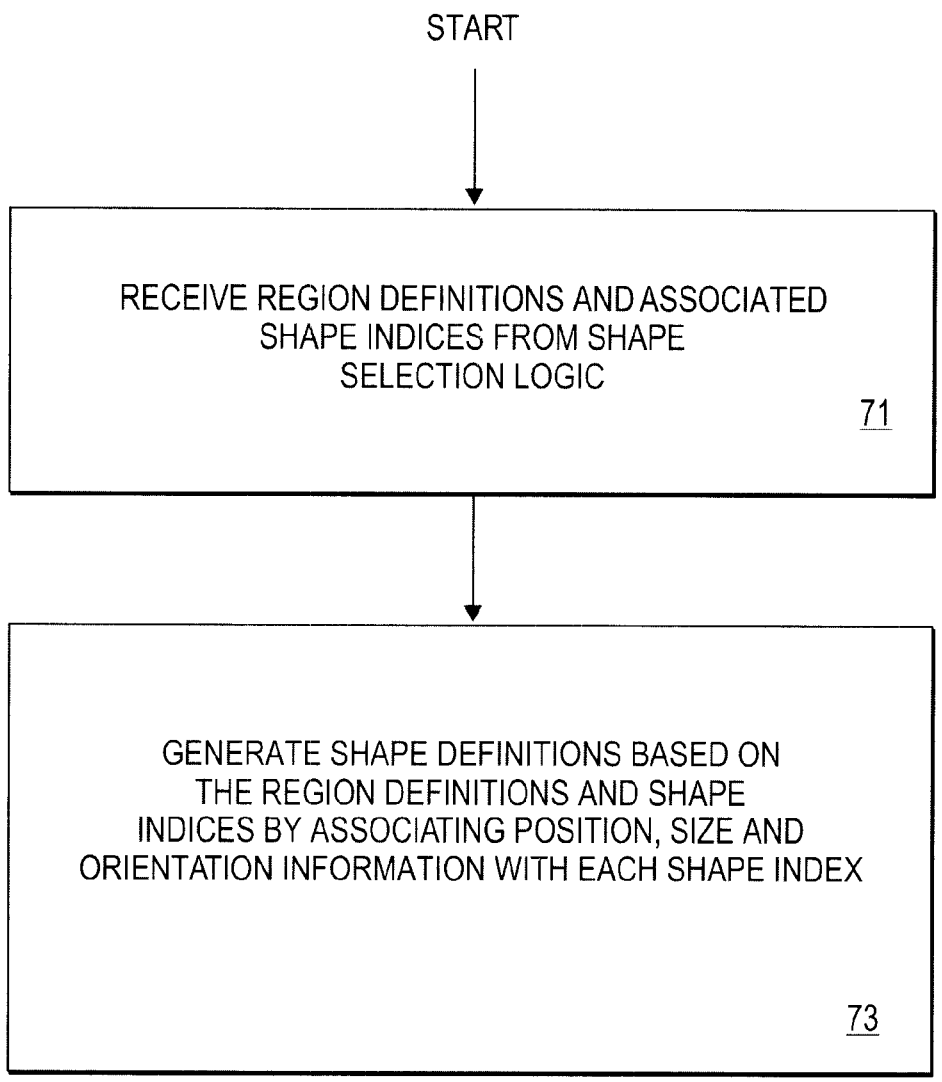
FIG. 6 is a flow diagram according to one embodiment of the shape positioning logic of FIG. 2.

FIG. 6 is a flow diagram according to one embodiment of the shape positioning logic 37 of FIG. 2. At step 71 the shape indices and associated region definitions are received from the shape selection logic. At step 73, the shape indices and region definitions are used to generate shape definitions, including position, size and orientation information, that can be used to construct shapes in an output image.

As mentioned above, it may be desirable to reorder the shape definitions so that the definitions of shapes which are partially hidden by other shapes are transmitted first. When the shape definitions are ordered in this way, the receiving device can construct shapes in the order in which their definitions are received. Shape definition reordering may take place in the boundary determination logic, the shape selection logic, the shape positioning logic or the transmitting logic. Further, in an alternate embodiment, it may be desirable to include information in each shape definition indicating whether a given shape hides (i.e., overlays) another shape instead of reordering the shape definitions. The receiving device may then use this information to determine the order of shape construction in the output image.

Figure 7:
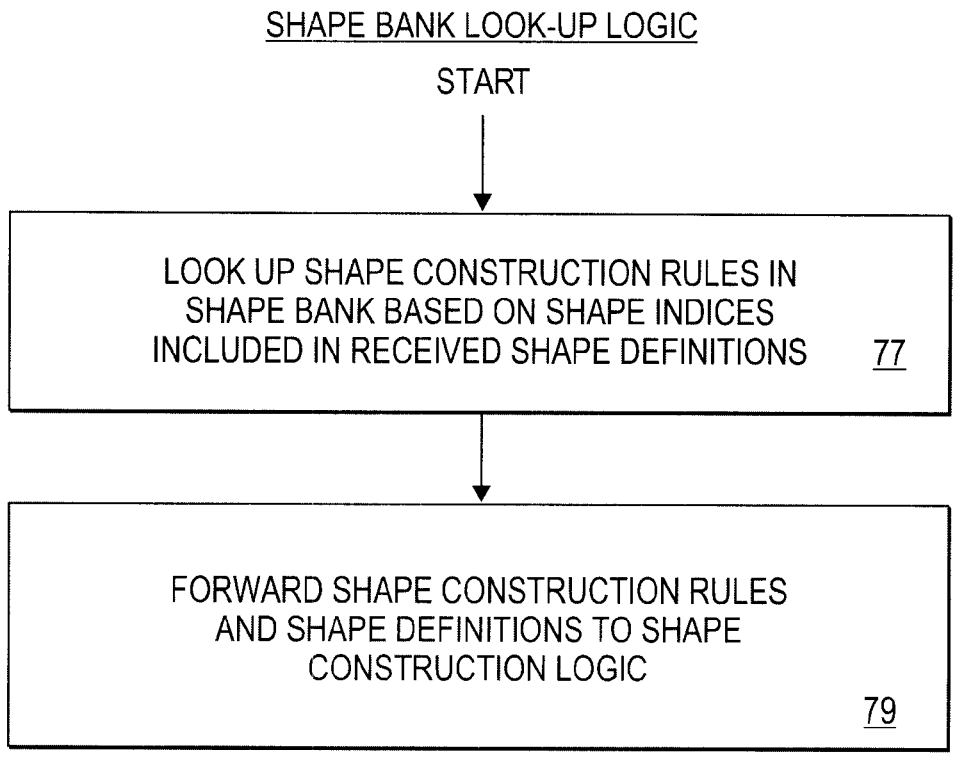
FIG. 7 is a flow diagram of one embodiment of the shape bank look-up logic of FIG. 3.

FIG. 7 is a flow diagram of one embodiment of the shape bank look-up logic 43 of FIG. 3. At step 77, shape construction rules are looked-up in a shape bank based on a shape index from a shape definition. In one embodiment, the shape construction rules are indicated by a pointer to a procedure that implements the construction rules. That is, by addressing the shape bank with the shape index, a pointer to a shape construction procedure is obtained. This procedure may then be called with the appropriate arguments to construct the shape. Alternatively, a handle to a script file may be read from the shape bank. The script file could then be executed to construct the shape. Generally, any technique for indicating a set of rules for constructing the shape indicated by the shape index is within the spirit and scope of the present invention. At step 79, the shape definition and the shape construction rules (or an indicator of the construction rules such as a pointer to a procedure or a file handle) are forwarded to the shape construction logic.

Figure 8:
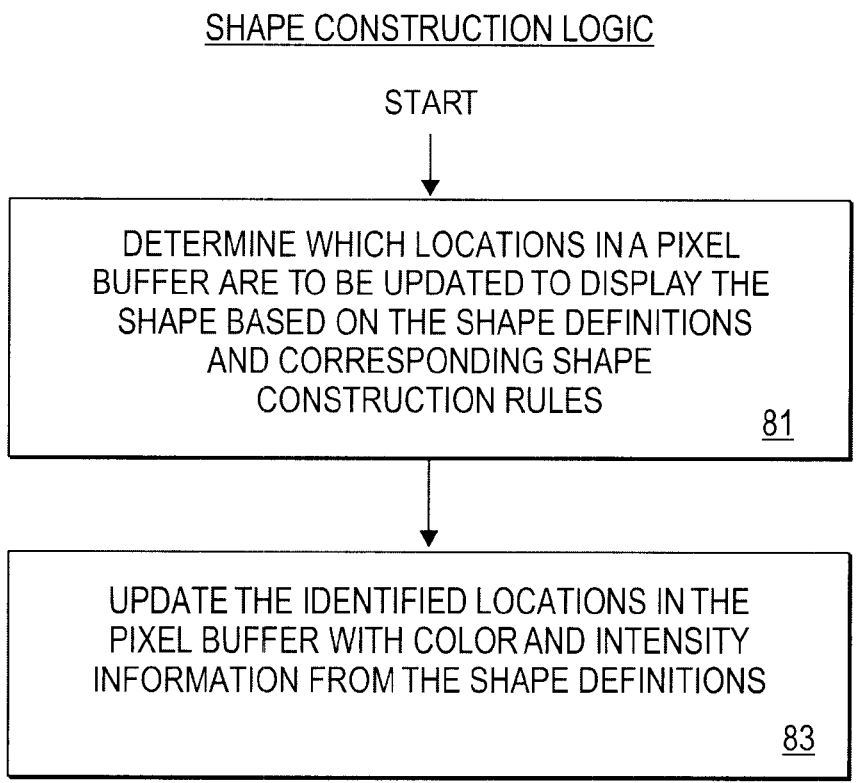
FIG. 8 is a flow diagram of one embodiment of the shape construction logic of FIG. 3.

FIG. 8 is a flow diagram of one embodiment of the shape construction logic 47 of FIG. 3. At step 81, the shape construction logic uses the shape construction rules and shape definitions forwarded by the shape bank look-up logic to determine which locations in a pixel buffer are to be updated. At step 83, the shape construction logic updates the identified locations in the pixel buffer with color and intensity information included in the shape definitions.

FIG. 9 is an image 200 that can be compressed and reconstructed using embodiments of the present invention. The image 200 includes a house composed of a variety of shapes. For example, the upper portion of the garage is a triangle 201, the garage vent is a circle 202, the garage door is a rectangle 205, and the sides of the garage that enclose the garage door are also rectangles (203 and 204). The garage door itself includes lines 206, 207 and 208. The side wall of the house is a rectangle 225, the windows are rectangles (226 and 231), the front door is a rectangle 212 and chimney is a rectangle 211. The door knob of the front door includes a circle 215 and a line 216, and the window in the front door is a semicircle 218 that includes lines 219 and 220. The windows (rectangles 226 and 231) are divided into panes by lines 233, 234, 228 and 229. The roof 217 is a rectangle with one edge being defined by a dashed line 209. As discussed below, complex shapes may be extended into simpler shapes that are overlapped by other regions in the image 200. Thus, the visible portion of the roof 210 may be extended from an irregular four-sided polygon into rectangle 217, despite the fact that a portion of rectangle 217 is beneath triangle 201.

FIG. 10 is a table of region definitions that correspond to the image of FIG. 9. According to one embodiment, each region definition includes a set of boundary definitions and a value that indicates which regions are to be constructed before the subject region. Although not shown, each region definition may include shading information that can be used to add color, color gradient or texture to a corresponding shape in the output image.

According to one embodiment, each of the boundary definitions includes a start point, an endpoint and, if mapped by a curve that has one or more inflection points (i.e, a nonlinear boundary), the coefficients of a polynomial expression that maps the boundary. For example, region 201 is defined by three boundaries that are first degree polynomials (i.e., lines) specified by starting and ending coordinates. Because region 201 partially overlaps region 217, region 201 is indicated to be constructed after region 217.

Region 202 includes two boundaries, each of which are second degree polynomials specified by starting and ending coordinates and by a coefficient, A, of the second order polynomial term. The circular region 202 is thus specified by a pair of parabolic equations having matching starting and ending points and different directions of inflection. Other polynomials, including an equation for a circle (e.g., $k=Ax^2+By^2$), may alternatively be used to map the circular region 202. Because region 202 completely overlaps region 201 and partially overlaps region 217, region 202 is indicated to be constructed after regions 201 and 217.

Region 205 is defined by four boundaries, all of which are lines (i.e., mapped by first degree polynomials) specified by starting and ending points. Region 206 is defined by a single boundary (indicating that the region itself is a line) and is to be drawn after region 205. Region 218 is defined by two boundaries, one boundary being mapped by a second degree polynomial that is specified by starting and ending coordinates and a coefficient, A, of the second order polynomial term. The other boundary is a line having the same starting and ending coordinates as the first boundary. Region 218 is indicated to be constructed after regions 225 and 212.

Region 219 is defined by a single boundary that is a line to be constructed after regions 225, 212 and 218. Region 217 is defined by four boundaries, all of which are lines specified by starting and ending points. Other regions of the image are defined in a similar manner.

According to one embodiment, the shape selection logic (e.g., element 33 of FIG. 2) uses the above-described region definitions to identify shapes in the shape bank and the shape positioning logic uses the region definitions to associate size, location and orientation parameters with the identified shapes.

FIG. 11 is a table of shape definitions that correspond to the image of FIG. 9 and that have been ordered for transmission according to the values in the region definitions that indicate construction sequence. Though not shown, shading information may be included in the shape definition.

As indicated, region 217 is determined to correspond to a rectangle. This determination is expected because the region 217 is bounded by four lines and the starting and ending coordinates of those lines define four approximately 90° interior angles. Using the region definition and the shape index (i.e., the indication that the shape is a rectangle), the shape positioning logic (e.g., element 37 of FIG. 2) associates information with the shape definition for region 217 that allows a rectangle to be constructed in an output image at the proper location and with the appropriate size and orientation. For example, in one embodiment, the shape positioning logic defines a rectangle by the starting and ending points of a lengthwise edge (EDGE1) of the rectangle and the width of the rectangle. The starting and ending points of the lengthwise edge indicate the position of the rectangle in the output image, the lengthwise edge and the width indicate the size of the rectangle, and the slope of the lengthwise edge (i.e, the difference between the vertical coordinates of the starting and ending points of the lengthwise edge divided by the difference between the horizontal coordinates of the starting and ending points of the lengthwise edge) indicates the orientation of the rectangle. As discussed below, by using a specific set of construction rules (as embodied, for example, in a construction procedure or script file) and the above-described shape definition, a rectangle corresponding to region 217 can be constructed in an output image.

Region 201 is determined to correspond to a triangle that is defined, according to one embodiment, by two edges. Because the two edges share at least one point (i.e., the starting point or ending point of one edge is the same as the starting or ending point of the other edge), one of the points may be dropped from the shape definition in an alternate embodiment. Region 202 is determined to correspond to a circle defined by a center coordinate and a radius, and regions 205 and 206 are determined to be rectangles each defined by an edge and a width. Other shape definitions are generated in a similar manner.

FIG. 12 is an example of a procedure that can be used implement a set of construction rules. As discussed above, in one embodiment, the shape bank look-up logic (e.g., element 43 of FIG. 3) uses the shape index included in each shape definition to identify a set of construction rules. If, for example, the shape index indicates that a rectangle is to be constructed, the shape bank look-up logic may receive a pointer to the procedure "construct_rectangle" listed in FIG. 12. The construct_rectangle procedure may then be called by the shape construction logic (e.g., element 47 of FIG. 3) using the width from the shape definition to supply the width parameter and the edge starting and ending coordinates to supply the startx, starty, endx, endy parameters. According to one embodiment, the shape construction logic also supplies a pointer to the pixel buffer in which the rectangle is to be constructed. This is indicated in the formal parameter list of procedure construct_rectangle by the "buffer" parameter. Also, as discussed above, shading information included in the shape definition, including a fill color, color gradient or texture may also be used in the construction of the rectangle. In one embodiment, this is accomplished by populating a data structure with the shading information and then passing a pointer to the structure to the construct_rectangle procedure. This is indicated in the formal parameter list by the "shading" parameter.

After the data type declarations of the formal parameters and the definition of temporary variables n1x, n1y, n2x and n2y, the executable portion of the construct_rectangle procedure begins. When construct_rectangle is executed, the find_normal procedure is called to determine a point that is a distance (width) from the rectangle's lengthwise edge (the edge being defined by passed parameters startx, starty, endx, endy) and that defines a line normal to the lengthwise edge that passes through the starting point of the lengthwise edge. This point, which represents a corner of the rectangle, is returned in parameters n1x and n1y. The find_normal is called a second time to find the last corner of the rectangle (note, two corners of the rectangle are defined by the starting and ending points of the lengthwise edge). This last corner is returned in parameters n2x and n2y. Having determined the coordinates four corners of the rectangle, a drawline procedure is called four times to construct lines between the four corner points. A pointer to a pixel buffer is passed to the drawline procedure so that the appropriate pixel values can be updated. After the rectangle has been delineated by calls to drawline, a fill procedure is called to update pixel values encompassed by the rectangle according to the pixel shading information in the shading data structure (i.e., the data structure pointed to by passed parameter "shading").

It will be appreciated that the construct_rectangle procedure of FIG. 12 may be varied in numerous respects. For example, any number of different programming languages or scripting languages may be used to implement the procedure, including languages that are compiled to an intermediate representation (e.g., the Java programming language) for execution by a virtual machine (typically a computer program executed to translate intermediate instructions into native instructions which are then executed by a host processor). The procedure may also be implemented as an object method, or as part of a script file. Also, additional parameters may be included. For example, a parameter may be passed to indicate whether or not to construct the rectangle borders in the output image, the width of the borders, and so forth.

Returning briefly to FIG. 9, it will be appreciated that by resolving the image 200 into shapes and then transmitting information that allows the shapes to be reconstructed in a recipient device, a high degree of image compression is achieved. It will also be appreciated that many images will have considerably more irregularly shaped regions than image 200. In such cases, a shape-based compression technique may be used to recognize and compress certain regions of the image while other, more amorphous regions may be compressed using more traditional techniques such as vector quantization. In other words, shape-based compression may be combined with other compression techniques to achieve a greater compression factor than is possible without any shape-based compression.

Figure 13:
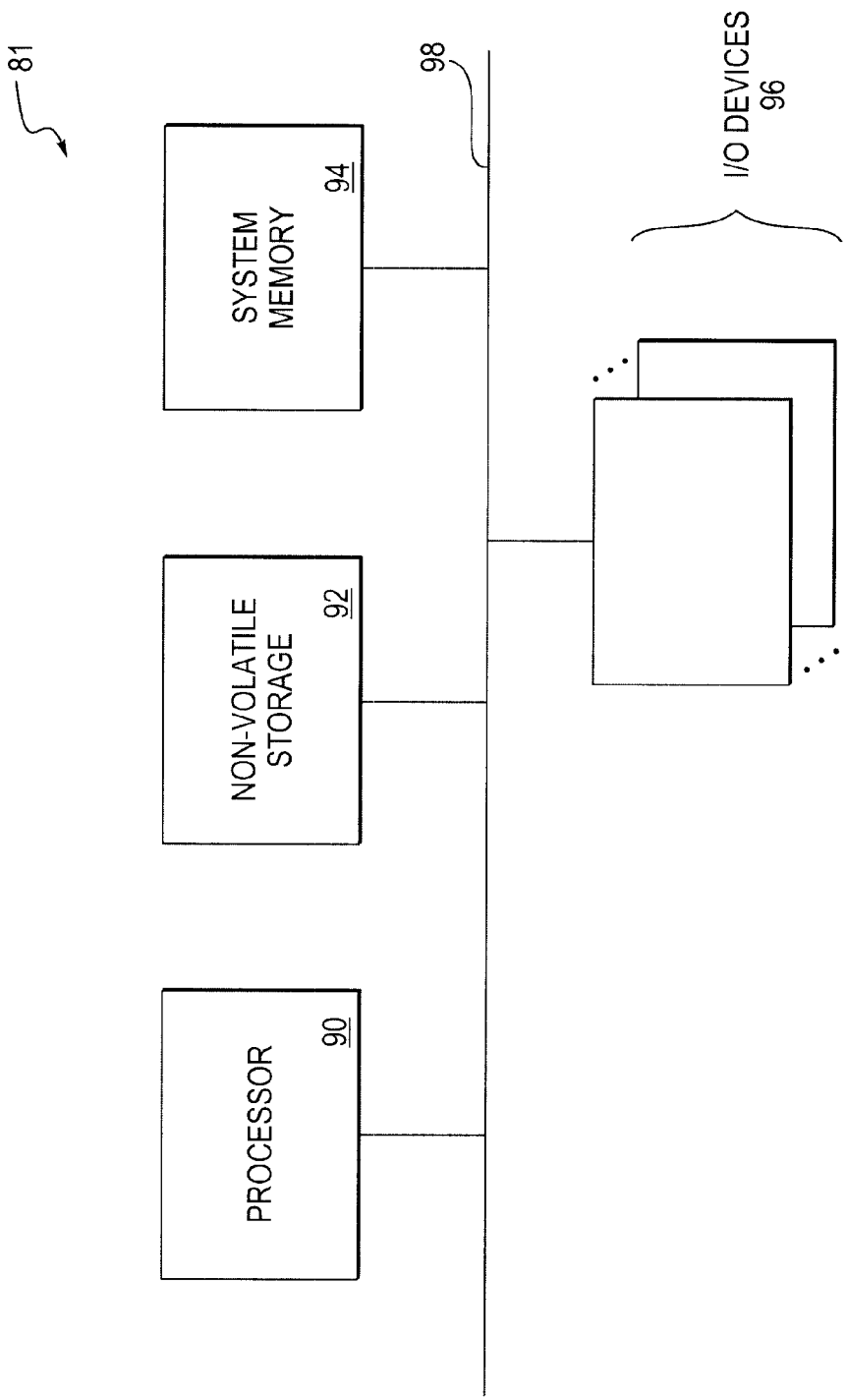
FIG. 13 is an architecture diagram of an apparatus that can be used to implement the encoder and decoder of FIG. 2 and FIG. 3, respectively.

FIG. 13 is an architecture diagram of one embodiment of an apparatus 89 that can be used to implement the encoder and decoder of FIG. 2 and FIG. 3, respectively. The apparatus 89 includes a processor 90, system memory 94, non-volatile storage 92 and one or more I/O devices 96, all intercoupled by a system bus 98.

The apparatus 89 may be a general purpose computer, a video camera, a digital camera, a video recording device or any other device which receives and transmits image data. In the case of a personal computer, the non-volatile storage 92 typically is used to store a boot program which is executed to load additional program code from one of the I/O devices 96 such as a magnetic or optical disk drive into system memory 94. In another device, such as a video camera, the non-volatile storage 92 may include the entire operating program for the device. In either case, program code that is executable by the processor 90 to implement the above described embodiments may be stored The I/O devices 96 will vary depending on the functionality required by the apparatus 89. In the case of a video camera, the processor 90 may be a microcontroller, and the I/O devices 96 may include image capture circuitry and a control interface to receive input from a user. In a general purpose computer, the I/O devices 96 would typically include user input devices such as a keyboard and mouse, a display device, one or more mass storage devices, a network connection device such as an area-network connection card or a modem, and any other device needed to support application programs executed by the computer. Application programs containing instructions to perform image encoding and decoding in accordance with the present invention may be stored on a computer-readable medium that can be accessed by the processor via an appropriate one of the I/O devices 96. Program code containing instructions to perform image encoding and decoding in accordance with the present invention may also be received in a network connection device via a carrier wave having the program code embodied therein. In other implementations, apparatus 112 may include additional I/O devices 96 coupled to the bus to provide application-specific functionality.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising:
    identifying boundaries of regions within a non-vector quantized, digitized image;
    associating a color, a color gradient, and a texture with the regions;
    selecting predetermined shapes to represent the regions from a first bank of shapes based on the identified boundaries, wherein the first bank of shapes has a shape index;
    associating position and size information with the selected shapes based on the position and size of the regions within the non-vector quantized, digitized image; and
    transmitting values indicating the selected shapes and the associated position and size information as a representation of the non-vector quantized, digitized image.

2. The method of claim 1 further comprising:
    receiving the values indicating the selected shapes and the associated position and size information;
    accessing a second bank of shapes based on the values indicating the selected shapes to obtain shape parameters of the selected shapes; and
    displaying the selected shapes based on the shape parameters and the position and size information on a display device.

3. The method of claim 2 wherein accessing the second bank of shapes to obtain shape parameters includes accessing the second bank of shapes to obtain information describing a geometric relation ship between features of the shapes.

4. The method of claim 1 wherein identifying boundaries of regions within a digitized image includes the step of detecting edges within the digitized image based on changes in pixel shading.

5. The method of claim 4 wherein detecting edges within the digitized image based on changes in pixel shading include detecting changes in pixel color.

6. The method of claim 1 wherein selecting shapes from a first bank of shapes based on the identified boundaries further includes determining a geometric relationship between two or more of the boundaries.

7. The method of claim 6 wherein selecting shapes from a first bank of shapes based on the identified boundaries further includes selecting a shape in the bank of shapes that has sides geometrically arranged relative to one another in a manner similar to the geometric relationship between the two or more boundaries.

8. The method of claim 1 wherein selecting shapes from a first bank of shapes includes selecting shape indices from the first bank of shapes based on the identified boundaries, each of the shape indices corresponding to a respective one of a plurality of shapes.

9. The method of claim 8 wherein transmitting values indicating the selected shapes includes transmitting the shape indices.

10. The method of claim 1 wherein associating position and size information with the selected shapes includes associating information with each of the shapes that indicates a position and an orientation of the shape relative to a frame of reference.

11. The method of claim 1 wherein transmitting values indicating the selected shapes and the associated position and size information includes transmitting the values and the position and size information to a non-volatile storage device for storage.

12. The method of claim 1 wherein transmitting values indicating the selected shapes and the associated position and size information includes transmitting the value and the position and size information to a computer via a computer network.

13. An apparatus comprising:
  means for identifying boundaries of regions within a non-vector quantized, digitized image;
  means for associating a color, a color gradient, and a texture with the regions;
  means for selecting predetermined shapes to represent the regions from a first bank of predetermined shapes based on the identified boundaries, wherein the first bank of shapes has a shape index;
  means for associating position and size information with the selected shapes based on the position and size of the regions within the non-vector quantized, digitized image; and
  means for transmitting values indicating the selected shapes and the associated position and size information as a representation of the non-vector quantized, digitized image.

14. The apparatus of claim 13 further comprising:
  means for receiving the values indicating the selected shapes and the associated position and size information;
  means for accessing a second bank of shapes based on the values indicating the selected shapes to obtain shape parameters of the selected shapes; and
  means for displaying the selected shapes based on the shape parameters and the position and size information on a display device.

15. A computer system comprising:
  a first processor; and
  a first memory coupled to the first processor and having stored therein
    a non-vector quantized digitized image;
    a first bank of predetermined shapes, wherein the first bank of shapes has a shape index; and
    program code which, when executed by the first processor causes the first processor to:
      identify boundaries of regions within a non-vector quantized, digitized image;
      associate a color, a color gradient, and a texture with the regions;
      select predetermined shapes to represent the regions from the first bank of shapes based on the identified boundaries;
      associate position and size information with the selected shapes based on the position and size of the regions within the non-vector quantized, digitized image; and
      transmit values indicating the selected shapes and the associated position and size information as a representation of the non-vector quantized, digitized image.

16. The computer system of claim 15 further comprising
  a network transmission path coupled to the first processor;
  a second processor coupled to the network transmission path;
  a display device coupled to the second processor; and
  a second memory coupled to the second processor and having stored therein
    a second bank of predetermined shapes, wherein the second bank of shapes has a second shape index; and
    program code which, when executed by the second processor causes the second processor to:
      receive via the network transmission path the values indicating the selected shapes and the associated position and size information;
      access the second bank of predetermined shapes based on the values indicating the selected shapes to obtain shape parameters of the selected shapes; and
      display the selected shapes based on the shape parameters and the position and size information on the display device.

17. The computer system of claim 16 wherein the network transmission path is coupled to a plurality of computers including at least a first computer that includes the first processor and a second computer that includes the second processor.

18. An article of manufacture including one or more computer readable media having program code stored thereon which, when executed by a processor, causes the processor to perform:
  identifying boundaries of regions within a non-vector quantized, digitized image;
  associating a color, a color gradient, and a texture with the regions;
  selecting predetermined shapes to represent the regions from a first bank of predetermined shapes based on the identified boundaries, wherein the first bank of shapes has a shape index;
  associating position and size information with the selected shapes based on the position and size of the regions within the non-vector quantized, digitized image; and
  transmitting values indicating the selected shapes and the associated position and size information as a representation of the non-vector quantized, digitized image.

* * * * *